Patented Sept. 25, 1923.

1,468,820

UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

PROCESS OF MAKING SHEETS OF PYROXYLIN COMPOUND.

No Drawing. Original application filed February 16, 1920, Serial No. 359,108. Divided and this application filed August 25, 1922. Serial No. 584,296.

*To all whom it may concern:*

Be it known that I, WILLIAM G. LINDSAY, a citizen of the United States, residing at Newark, in the county of Essex and State of New Jersey, have invented certain new and useful Improvements in Processes of Making Sheets of Pyroxylin Compound, of which the following is a specification.

The principal object of my invention is to provide a new and improved composition of matter having the quality of flexibility as well as other desirable qualities. This and other objects of my invention will be made apparent in the following specification and claims, in which I disclose certain specific embodiments of the invention.

It has been known that when it was desired to make a variety of "celluloid" or similar substance having a high degree of flexibility, this end could be attained by the addition of castor oil. Thus, in addition to the usual ingredients in celluloid, namely, nitrocellulose and camphor, a more flexible variety could be obtained by the inclusion therewith of a certain amount of castor oil. On the other hand, compositions obtained in this way have a number of disadvantages. They may become rancid and some preservative has to be included to counteract this; also such a composition including castor oil is apt to deteriorate rather rapidly and become weak and brittle. Castor oil has been used to confer flexibility on other celluloid-like substances, such as a composition of matter obtained by bringing together in a suitable manner nitrocellulose and tricresylphosphate.

I have discovered an improved way for securing flexibility of such a material, by which the use of castor oil is entirely avoided and its disadvantages are avoided and a superior product is obtained.

Heretofore, in the preparation of a celluloid-like substance from nitrocellulose and tricresylphosphate, the proportions used have been usually about 100 parts of nitrocellulose and 30 to 50 parts of tricresylphosphate. This gives a firm celluloid-like substance when it is molded. Like celluloid it can be given an increased flexibility by the addition of castor oil. My discovery and improvement involves greatly increasing the proportion of tricresylphosphate and not using any castor oil. The following is one specific example of procedure in accordance with my discovery and invention.

I take 100 parts of nitrocellulose and 40 parts of tricresylphosphate and unite them in accordance with the procedure described in my Patent No. 1,233,374, that is, I wet the nitrocellulose and then work the tricresylphosphate in with it until a pomogeneous plastic mass is obtained. Next, I extract the moisture and then add a small proportion of any suitable solvent, such for example as acetone, alcohol and ether or any other of the well known pyroxylin solvents which will also dissolve tricresylphosphate, and 100 parts additional of tricresylphosphate and work this up on kneading rolls until it is thoroughly mixed and homogeneous and then press it into a solid block. In this form the composition is of yielding flexible character like india rubber.

If sheets of any thickness are desired, they may be shaved from this block by shaving machines in the same manner as from "celluloid" blocks, or by dissolving the product in volatile solvents flowing and evaporating the same in the usual manner.

I may use other proportions of tricresylphosphate. Indeed I secure increased flexibility with proportions running all the way from 60 to 500 parts in the aggregate of tricresylphosphate to 100 parts of nitrocellulose.

For some uses, I may substitute triphenylphosphate or other aromatic phosphate in place of tricresylphosphate, using substantially the same proportions as above specified, but in general I prefer tricresylphosphate because of its superior qualities and resulting better product.

The substance has many applications. By using a large quantity of solvent it can be obtained in liquid form and then brushed upon fabric or other surfaces like a varnish and when the solvent dries out the flexible coating will remain closely adherent to the surface. It can be molded and pressed into various desired shapes. Blocks of this composition may be used for cushion buffers. By using a suitable fabric and suitable thickness of the material herein described and claimed, I can produce superior varieties of so-called artificial leather and the surface can be stamped in imitation of morocco or alligator skin or in any other way. Thin sheets, say 5/1000 to 1/100 of an inch in thickness, may be laid on closely woven cotton fabric that has been brushed over with the solvent. Upon application of pressure, together with heat the sheet of the substance is intimately united to the fabric. The result is a highly flexible water-proof fabric. It can be crumpled up compactly in the hand without acquiring any set and without breaking the coating. These are only a few suggestions of the many uses to which the improved material may be put.

In addition to flexibility my improved composition has other advantageous qualities as follows: It is much more durable than those celluloids or celluloid-like substances which have been made flexible by the addition of castor oil; it is waterproof and also not easily inflammable and the difficulty of igniting it increases with the proportion of tricresylphosphate so that, for instance, with 300 parts tricresylphosphate to 100 parts pyroxylin the product is substantially non-inflammable. The ingredients are comparatively inexpensive and the process of uniting them is not expensive so that the material may be cheaply produced.

This case is division of my application, Serial No. 359,108, for improvement in pyroxylin compound and process of making same, filed February 16, 1920.

I claim:—

1. In the method of making a sheet of permanently flexible material the steps which consist in working upon rolls a mixture of approximately 100 parts of nitrocellulose and upwards of 60 parts of an aromatic phosphate, then pressing the mass into a solid block, and then shaving a sheet therefrom.

2. In the method of making a sheet of permanently flexible material the steps which consist in working upon rolls a mixture of approximately 100 parts of nitrocellulose and upwards of 60 parts of a tricresylphosphate, then pressing the mass into a solid block, and then shaving a sheet therefrom.

3. The method of making a sheet of permanently flexible material which consists in working upon rolls in the presence of a mutual volatile solvent a mixture of approximately 100 parts of nitrocellulose and upwards of 60 parts of an aromatic phosphate, then pressing the mass into a solid block, and then shaving a sheet therefrom.

4. The process of forming flexible sheets which consist in shaving said sheets from a block of rubber-like consistency formed of 100 parts of a cellulose ester and in excess of 60 parts of an aromatic ester.

5. In the method of making a sheet of permanently flexible material, the steps which consist in working together nitrocellulose and an aromatic phosphate in the presence of water, extracting the water, working into the mass additional phosphate, pressing the mass into a solid block of rubber-like consistency and shaving sheets from said block.

WILLIAM G. LINDSAY.